United States Patent [19]

Bunn

[11] Patent Number: 4,761,257
[45] Date of Patent: Aug. 2, 1988

[54] METHOD AND APPARATUS FOR FOAM MOLDING PACKAGING USING A STAGED VACUUM

[75] Inventor: Eric R. Bunn, Elmwood Park, N.J.

[73] Assignee: Sealed Air Corporation, Stamford, Conn.

[21] Appl. No.: 927,732

[22] Filed: Nov. 5, 1986

[51] Int. Cl.⁴ .................. B29C 67/22; B29C 39/10
[52] U.S. Cl. .................. 264/46.5; 264/46.6; 264/46.8; 264/101; 264/267; 264/338; 425/127; 425/817 R
[58] Field of Search .............. 264/46.4, 46.5, 46.8, 264/46.6, 101, 267, 338; 425/127, 817 R

[56] References Cited

U.S. PATENT DOCUMENTS

| | | | |
|---|---|---|---|
| 2,979,246 | 4/1961 | Liebeskind | 229/14 |
| 3,204,385 | 9/1965 | De Remer et al. | 53/27 |
| 3,222,843 | 12/1965 | Schneider | 53/27 |
| 3,952,082 | 4/1976 | Arnaud | 264/46.6 |
| 3,984,516 | 10/1976 | Carrow | 264/230 |
| 4,066,725 | 1/1978 | Boettner | 264/40.5 |
| 4,118,454 | 10/1978 | Miki et al. | 264/93 |
| 4,127,631 | 11/1978 | Dempsey et al. | 264/92 |
| 4,177,238 | 12/1979 | Allen | 264/328 |
| 4,278,624 | 7/1981 | Kornylak | 264/37 |
| 4,390,337 | 6/1983 | Gately | 264/46.4 X |
| 4,422,988 | 12/1983 | Kornylak | 264/40.3 |

Primary Examiner—Philip Anderson
Attorney, Agent, or Firm—Bell, Seltzer, Park & Gibson

[57] ABSTRACT

A method and apparatus for foam molding packaging using a staged vacuum system to place a plastic sheet used as a release agent in conformity with the surface of the mold is provided. A mold having a complex image divides the mold image into separate and distinct sections. A plastic sheet is placed loosely over the mold in covering relation to the image and a vacuum is drawn on the surfaces of the separate and distinct sections of the mold image in a staged sequence to cause the plastic sheet to conform to the surfaces of the mold image on the mold.

9 Claims, 4 Drawing Sheets

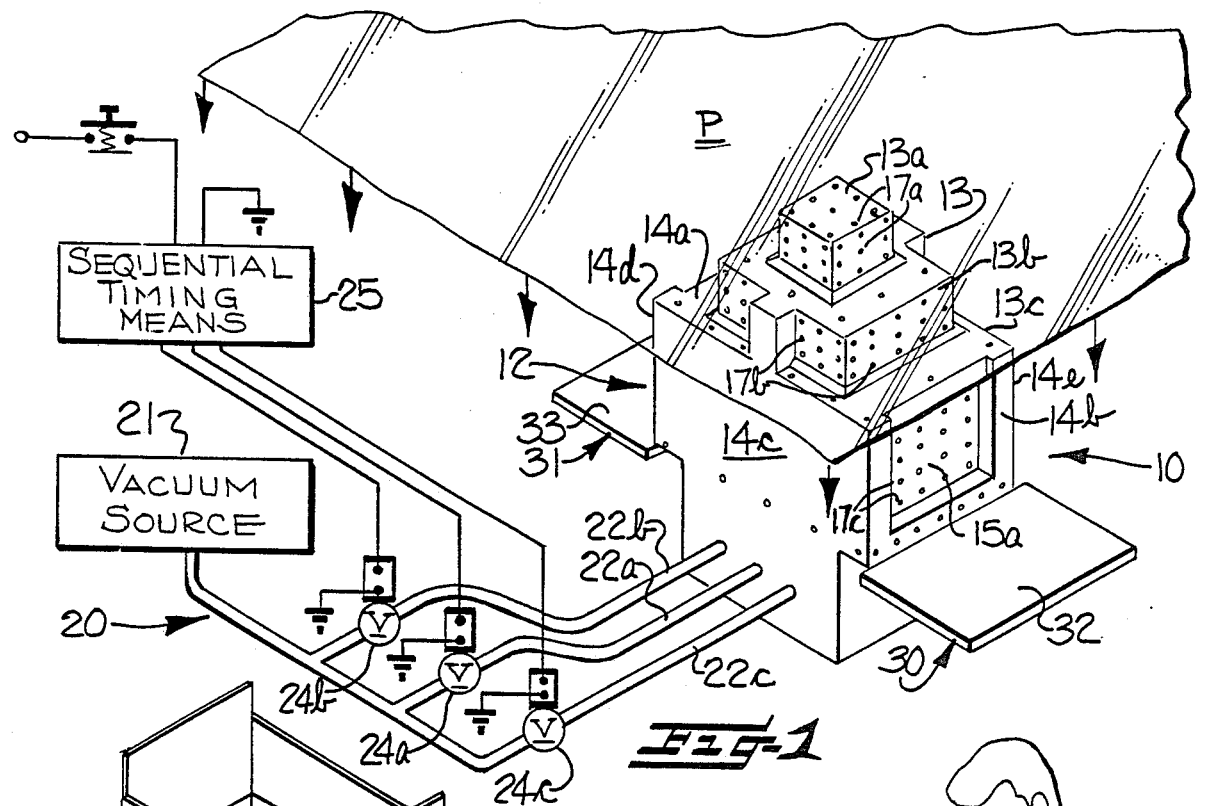
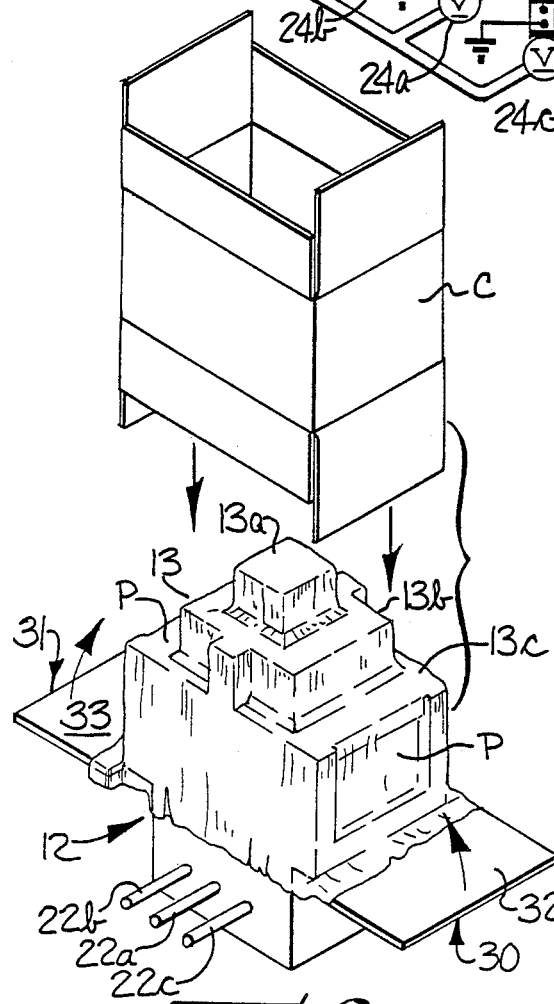
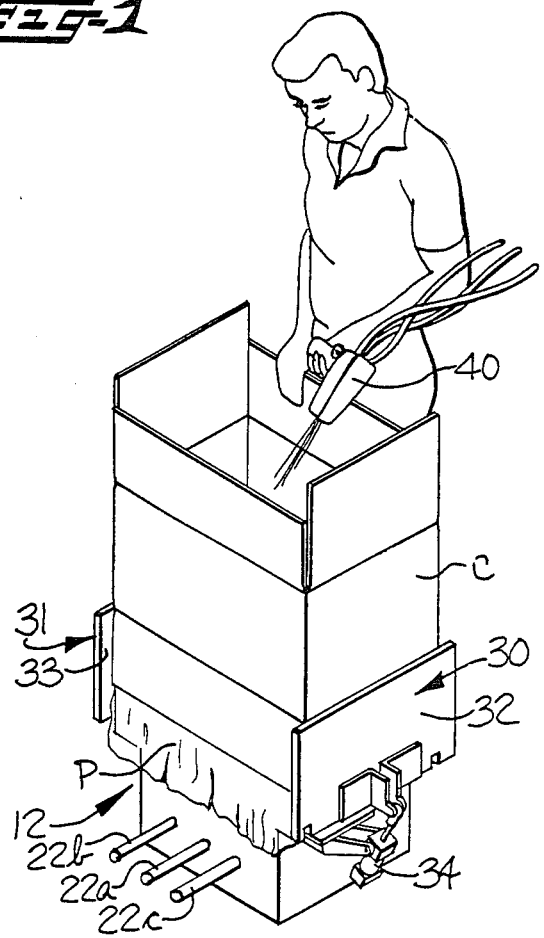

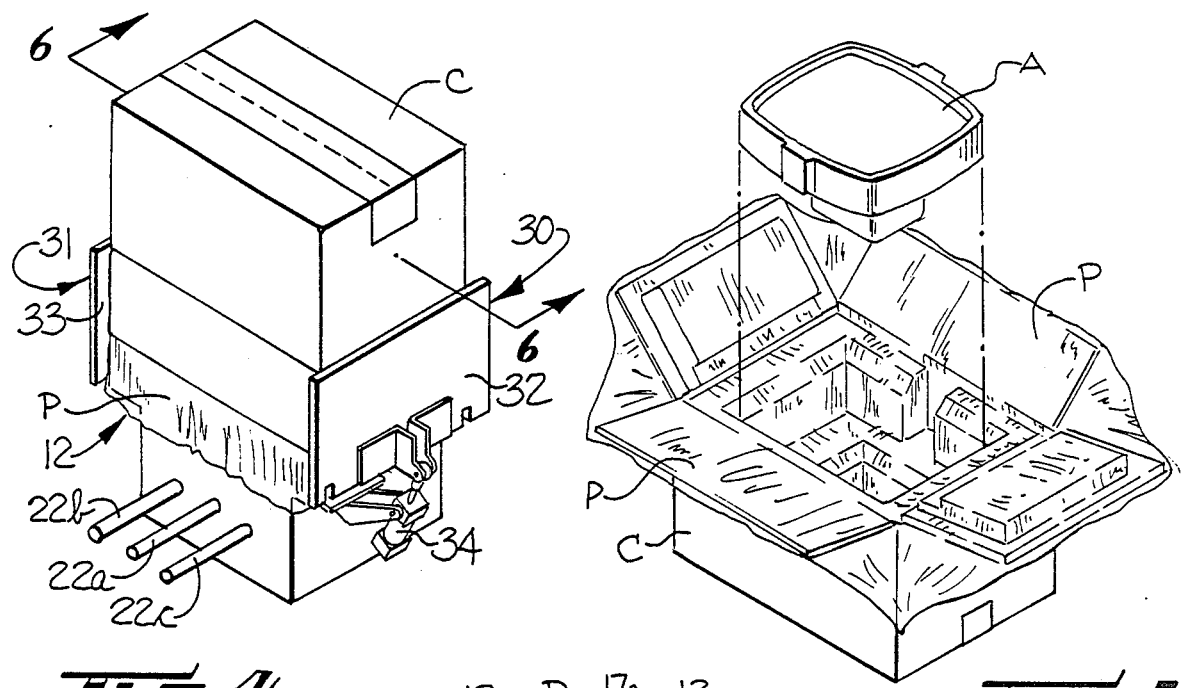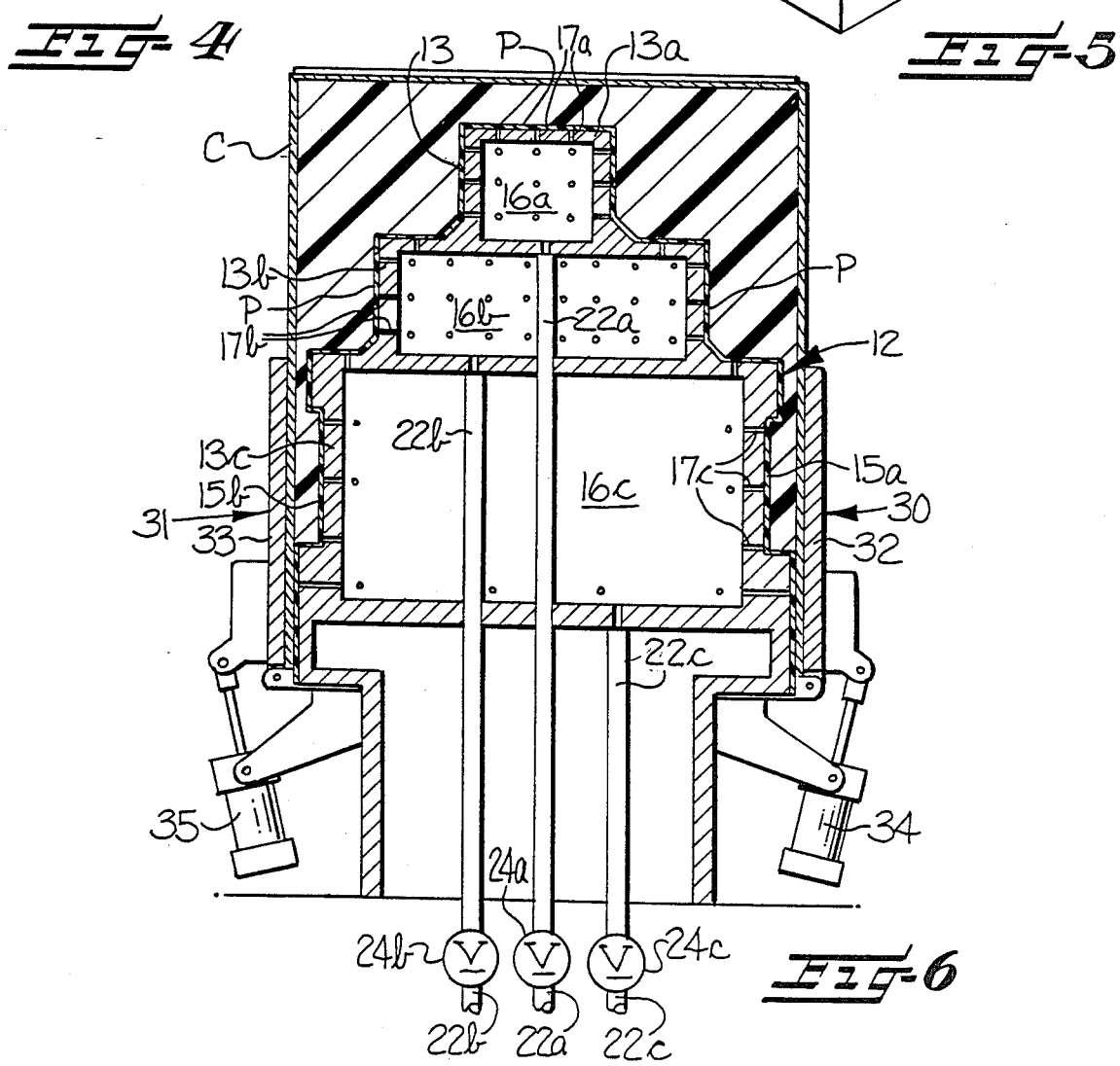

METHOD AND APPARATUS FOR FOAM MOLDING PACKAGING USING A STAGED VACUUM

This invention relates to a method and apparatus for the molding of foam cushioning and more particularly to such a method and apparatus which uses a plastic sheet as a release agent for the molded foam cushioning.

BACKGROUND OF THE INVENTION

The production and shipment of complex and intricate parts mandates the use of packaging giving protection against many environmental hazards such as shock, thermal conditions, moisture and abusive handling. A commonly used means of providing such protection is molded foam cushioning surrounding the article during handling and shipment.

One example of such cushioning is produced by the molding of the foam cushioning directly within a shipping carton. Such carton molding utilizes a mold provided with an image substantially conforming to the shape and size of the article to be packaged and over which is positioned a carton in which the foam cushioning is to be molded. The bottom portion of the mold contains flap mold areas which are designed to receive the lower flaps of the carton and to mold foam panels onto at least two of these carton flaps so as to cover and protect the packaged articles when the carton is closed.

Another example of such foam cushioning is produced by the molding of foam cushions in complementary halves so that the article to be packaged may be protectively encased between the two halves. The benefit of this system is that the foam cushions may be designed so that they can be placed within a similarly sized carton or as integral packages which may be shipped as they are. The molding of these foam cushions utilizes upper and lower male and female molds which determine the shape of the molded foam cushions and the shape and size of the article receiving cavities therein.

To serve as a release agent, a plastic sheet is normally used to cover the surface of the mold prior to the injection of the foam precursors into the carton or into the mold cavity in the case of foam cushion molding. This plastic sheet adheres to the foam and serves to cause the molded foam cushioning to be readily and easily removable from the mold and also as a separation between the article being packaged and the foam cushioning.

For the plastic sheet to serve as an effective release agent while not interfering with the proper molding of the foam cushioning, the plastic sheet must conform closely and smoothly to the surface contours of the mold. On very simple molds, this is easily accomplished by draping the mold with the plastic sheet and applying a vacuum on the surfaces of the mold in order to draw the plastic sheet into conformance with the surface contours thereof. The vacuum may also be used to hold the plastic sheet to the mold during the actual molding operation if such is deemed desirable.

However, because of the complexities of the images on many of the molds used in the molding of foam cushioning, vacuum alone has proven insufficient to cause the plastic sheet to conform closely and smoothly to the surface contours of the mold, but frequently the plastic sheet will have ripples or folds formed therein or the plastic sheet will bridge certain intricate portions of the surface contours resulting in malformed foam cushioning. To ensure that this problem does not occur, it is the usual practice for an operator to manually tuck or place the plastic sheet into those areas of the mold surface where it is anticipated that the vacuum alone will be insufficient to draw the plastic sheet into conformance with the surface contours of the mold prior to the vacuum being drawn on the mold surface.

With the foregoing in mind, it is an object of the present invention to provide an apparatus and method for molding foam cushioning using a plastic sheet as a release agent which overcomes the aforementioned problems of properly positioning the plastic sheet in conformity with the surface contours of complex or intricate molds.

It is a more specific object of the present invention to provide an apparatus and method for molding foam cushioning used in packaging which uses a plastic sheet as a release agent which avoids the necessity of manually placing the plastic sheet in conformity with the surface contours of the mold.

SUMMARY OF THE INVENTION

The present invention provides a method and apparatus for molding foam cushioning used in packaging using a plastic sheet as a release agent in which the surface contours of the mold are sectioned into separate areas independently connected to a vacuum source so that a vacuum may be drawn on these areas in a staged or timed sequence to properly draw the plastic sheet into close conformity with the surface contours of the mold without rippling, wrinkling or folding thereof.

In accordance with one embodiment of the invention, there is provided a mold designed to receive and position an open-ended carton in which the foam cushioning is to be molded. The mold includes a male mold image on the upper portion thereof which is of a size and shape generally conforming to the size and shape of the article to be packaged, and further includes channeled flap areas on the sides of the mold for the molding of foam panels onto the carton flaps. The surface contours of the mold are sectioned into distinct and separate areas, with each surface area being separately and independently connected to a vacuum source so that a vacuum may be drawn on the surface areas of the mold in a staged or timed sequence in order to properly draw a plastic sheet into conformity with the mold surface.

Another embodiment of the invention provides a mold for molding foam cushions in complementary halves and including a top mold having male images and a bottom mold having female images. The mold surfaces of the top and bottom molds are similarly sectioned into distinct and separate areas with each surface area being separately and independently connected to a vacuum source so that a vacuum may be drawn on these surface areas in a staged or timed sequence.

BRIEF DESCRIPTION OF THE DRAWINGS

The above description, as well as further objects, features and advantages of the present invention, will be more fully understood by reference to the following detailed description of a presently preferred, but nonetheless illustrative method and apparatus for the molding of foam cushioning and more particularly to such a method and apparatus which uses a plastic sheet as a release agent for the molded foam cushioning.

FIG. 1 is a perspective view, partially schematic, of an apparatus of the present invention and illustrating the covering of the mold with a plastic sheet;

FIG. 2 is a view similar to FIG. 1 illustrating the placement of a shipping carton over the mold;

FIG. 3 is a view similar to FIG. 2 showing an operator manually injecting foam precursors into the carton;

FIG. 4 is a view similar to FIG. 3 illustrating the closed carton in which the foam precursors are permitted to foam;

FIG. 5 is a perspective view, partially exploded, illustrating the shipping carton with foam cushioning therein and an article being packaged therein;

FIG. 6 is an enlarged sectional view taken substantially along line 6—6 of FIG. 4;

DETAILED DESCRIPTION OF THE PREFERRED EMBODIMENTS

Figure 7:
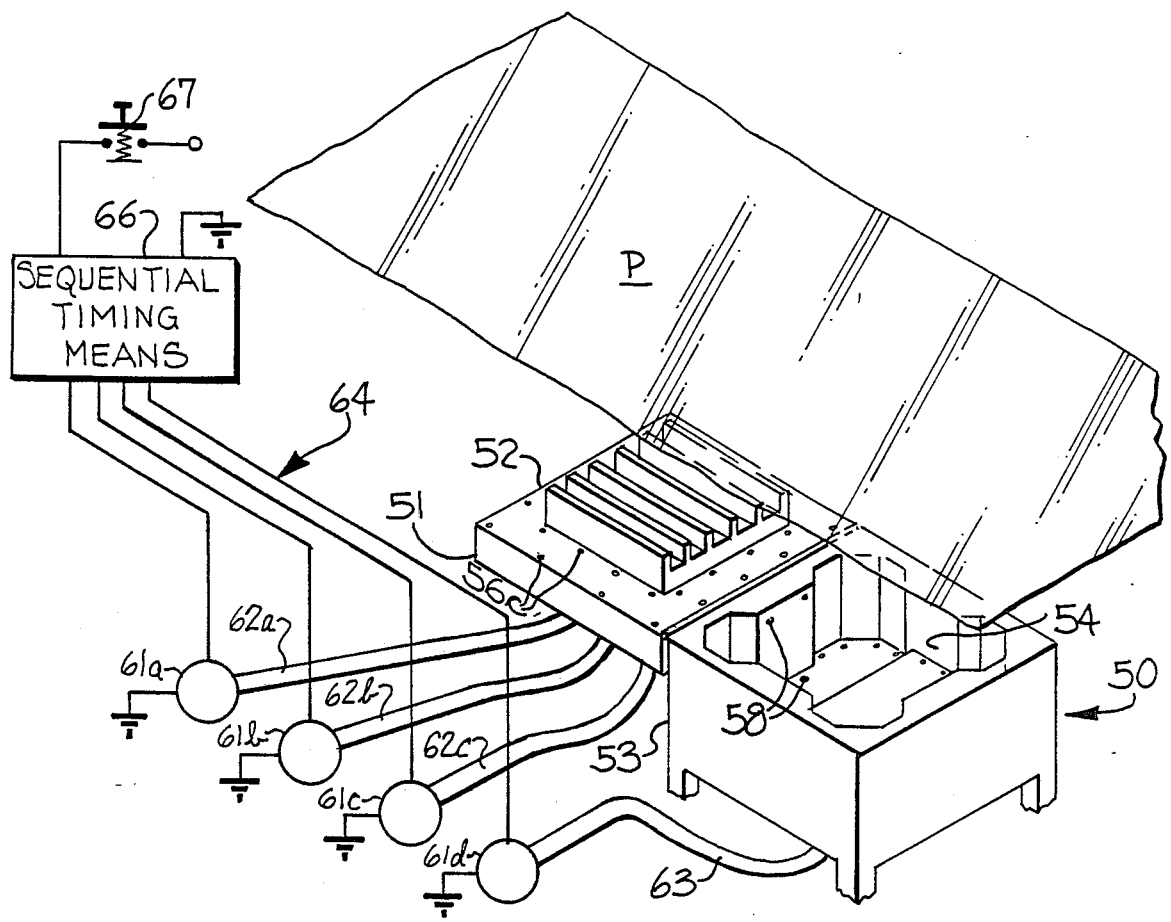
FIG. 7 is a perspective view similar to FIG. 1 of another embodiment of the present invention and also showing the preferred method of using timed vacuum motors to draw a vacuum.
Figure 8:
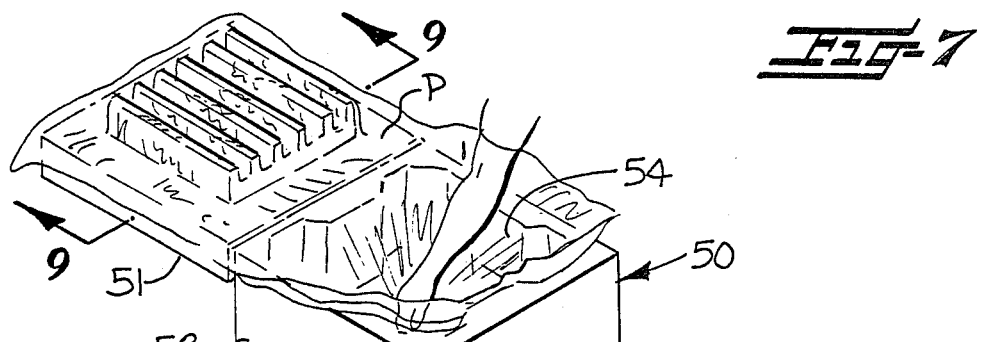
FIG. 8 is a fragmentary perspective view of the apparatus shown in FIG. 7 and illustrating the placement of a plastic sheet over the mold.

Referring now to the drawings and particularly to FIGS. 1-6, there is shown a first embodiment of the present invention comprising a method and apparatus for molding foam cushioning using a plastic sheet as a release agent. The apparatus is designated generally at 10 in FIG. 1, which also illustrates the step of placing a plastic sheet P in covering relation to a mold 12 having a relatively complex mold image 13 thereon. The mold 12 has the mold image 13 thereon divided or separated into three separate and distinct sections 13a, 13b and 13c from the uppermost and central portion 13a of the image 13 to the lower- and outer-most section.

Mold image portions 13a and 13b are of a size an shape corresponding to the size and shape of an article A (FIG. 5) to be packaged and mold image portion 13c has a top surface 14a substantially surrounding the mold image portion 14b and extending outwardly therefrom to define and form the top of the foam cushioning formed in a shipping carton C. Mold image portion 13c further includes four vertical side walls 14b, 14c, 14d and 14e. Opposing side walls 14b and 14d have flap areas or images 15a and 15b thereon, respectively, for molding foam panels onto two of the flaps of shipping carton C. The flap mold images 15a, 15b comprise open-topped, closed-bottomed channels of a suitable size and shape to form the foam panels on the carton flaps which together will close the top of the cavity in the foam cushioning formed by the mold image portions 13a and 13b when the carton flaps are closed (FIG. 5).

The interior of the mold 12 is also divided or separated into three separate and distinct sections or chambers 16a, 16b and 16c (FIG. 6) which communicate respectively with the outer surfaces of mold image portions 13a, 13b and 13c by apertures 17a, 17b and 17c, respectively. Means for drawing a vacuum on the surfaces of mold 12 in a staged sequence to cause the plastic sheet P to closely and smoothly conform to the surfaces of the mold image 13 is illustrated schematically in FIG. 1 and is generally indicated at 20. Means 20 includes a vacuum source 21 separately connected to respective chambers 16a, 16b and 16c of the mold 12 by pipes 22a, 22b, and 22c, respectively (FIGS. 1 and 6).

Sequential staging means 23 for separately timing or staging the drawing of a vacuum onto each separate and distinct sections 13a, 13b, and 13c of the mold image 13 is provided and includes gate valves and solenoids 24a, 24b and 24c connected in the respective pipe 22a, 22b and 22c. The gate valves 24a, 24b and 24c are connected to a sequential timing means 25 for sequentially timing or staging the operation of the solenoids to open and close the gate valves to control the drawing of a vacuum on each separate and distinct section 13a, 13b, and 13c of the mold image 13.

Clamping means 30, 31 are provided for clamping the lower flaps of carton C against the sides 14b and 14d of the mold image portion 13c of mold 12 and comprise clamping members 32, 33 pivotally mounted on the lower portions of the mold 12 beneath the mold flap images 15a, 15b. Pneumatic or hydraulic actuating means 34, 35 (FIG. 6) are connected to the clamping members 32, 33 for moving the clamping members between clamped and unclamped positions.

The molding of foam cushioning in accordance with the first embodiment of the present invention is commenced by draping the plastic sheet P over the mold 12 either manually or by a suitable means (not shown). The sequential staging means 23 for drawing a vacuum is turned on by an operator closing a start switch 36 (FIG. 1). The sequential timing means 25 is programmed to open the gate valves 24a, 24b, and 24c at predetermined intervals beginning with the valve 24a leading to the centermost chamber 16a and then sequentially with the valves 24b and 24c leading to the intermediate chamber 16b and lowermost chamber 16c, respectively. The vacuum is transmitted to the surface of the mold 12 by apertures 17a, 17b and 17c to draw the plastic sheet P into close conformity first with the surface contours of the mold image portion 13a without rippling, wrinkling or folding thereof, and then sequentially in the same manner with the remaining mold image portions 13b and 13c.

The open-ended shipping carton C is then placed over the plastic sheet covered mold 12. Two of the lower flaps are positioned against opposing sides 14b and 14d and the clamping members 32, 33 are moved to the clamping position by the actuating means 34, 35 thereby clamping the lower flaps of carton C against the sidewalls 14b and 14d and in proper position relative to the flap mold images 15a and 15b.

An operator then manually dispenses foam precursors into the carton C onto the mold image 13 of mold 12 by dispensing means 40. The amount of foam precursors injected into the carton C may be predetermined and dispensing means 40 preset to dispense the correct predetermined amount. Alternatively, an automatic dispensing system may be used.

The upper flaps of the carton C are then closed (FIG. 4) and secured tightly by glue or tape to form the bottom of the carton C before the foaming of the precursors is completed. Once the foaming of the precursors is completed, the clamping members 32, 33 are moved to the unclamped position and the finished carton removed. Because the plastic sheet P is between all the surfaces of the mold 12 and the foam cushioning, the plastic sheet forms a release agent so that the carton C with the foam cushioning therein may be removed easily from the mold 12. In addition, the plastic sheet P, which firmly adheres to the foam cushioning, forms a separation between the article A to be packaged and the foam cushioning (FIG. 5).

Figure 9:
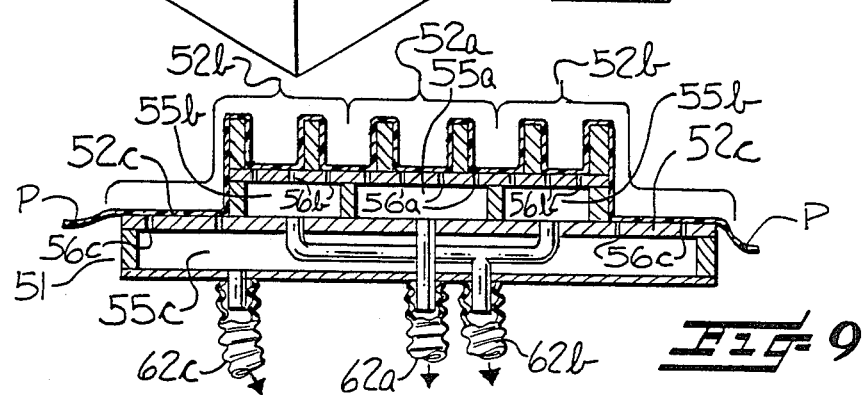
FIG. 9 is an enlarged sectional view taken substantially along line 9—9 of FIG. 8.

A second embodiment of the invention is illustrated in FIGS. 7–14. In this embodiment of the invention, there is provided a mold 50 for forming foam cushions in complementary halves. These complementary halves are adapted to receive an article A to be packaged therebetween and to closely confine and protect that article. Mold 50 includes a top mold 51, having a male mold image 52 thereon, pivotally connected to a bottom mold 53, having a female mold image 54 therein. The mold male image 52, is divided into separate and distinct portions 52a, 52b and 52c (FIG. 9). The mold female image 54 is illustrated as being only one portion (FIG. 13), but could be divided into separate and distinct portions as needed for proper application of the plastic sheet P thereto.

The interior of the top mold 51 is divided into three separate chambers 55a, 55b and 55c (FIG. 9) which communicate respectively with the outer surfaces of mold image portions 52a, 52b and 52c by apertures 56a, 56b and 56c, respectively. The interior of bottom mold 53 is illustrated as having a single chamber 57 therein which communicates with the surface of the female mold image 54 by apertures 58. It should be understood that multiple separate chambers may be used inside bottom mold 53 should sequential staging of the drawing of a vacuum on the surface of female mold image 54 be deemed necessary or desirable.

Means for drawing a vacuum of the surfaces of the mold images of molds 51, 53 in a staged sequence to cause the plastic sheet P to closely and smoothly conform to the surfaces of the mold images 52 and 54 is provided and include separate vacuum motors 61a, 61b, 61c and 61d (FIG. 7) separately connected to each of the separate and distinct sections 55a, 55b, 55c, and 57 of the mold images 52 and 54 by vacuum hoses 62a, 62b, 62c, and 63. Sequential staging 64 for separately timing or staging the drawing of a vacuum into each interior mold chamber 55a, 55b, 55c and 57 of the molds 51 and 53 incldes a sequential timing means 66 for sequentially timing the operation of each vacuum motor 61a, 61b, 61c and 61d to control the drawing of the vacuum. This use of multiple vacuum motors 61a, 61b, 61c and 61d which may be separately timed is the preferred method of the invention since most molds are of a size which would demand a large vacuum motor if only one vacuum motor and a gate valve/solenoid arrangement were used.

The molding operation of foam cushions in accordance with the second embodiment of the present invention is commenced by the draping of a plastic sheet P over the top and bottom molds 51 and 53 either manually or by a suitable means (not shown). The sequential staging means 64 is turned by an operator by closing a start switch 67 which actuates the sequential timing means 66. Timing means 66 is pre-programmed to operate the vacuum motors 61a, 61b, 61c and 61d at predetermined intervals beginning with the vacuum motor 61a leading to the centermost chamber 55a of the top mold 51 and progressing outwardly with chambers 55b and 55c, respectively, and ending with the drawing of a vacuum in chamber 56 in the bottom mold image 53.

Because of the staged drawing of the vacuum in this manner, the plastic sheet P drawn into close and conforming relation to the surface of the male mold image portions 52a initially and then progressively outwardly for the remaining mold image portions 52b and 52c and finally for the female mold image 54.

Figure 10:
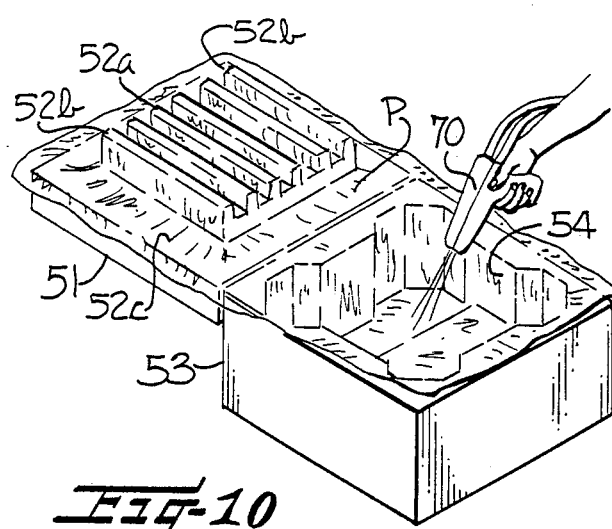
FIG. 10 is a view similar to FIG. 3 showing an operator manually injecting foam precursors into the mold.
Figure 11:
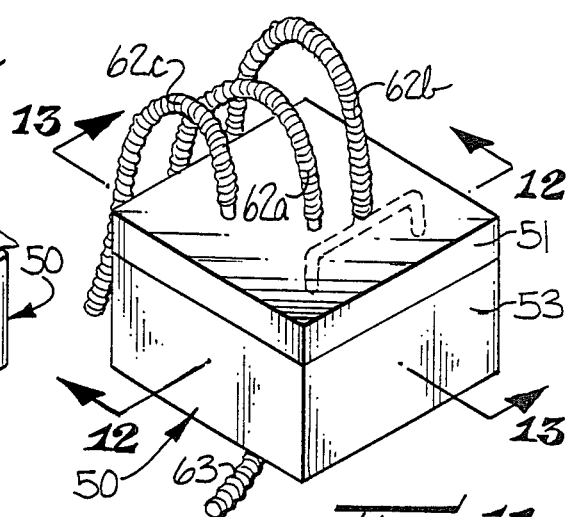
FIG. 11 is a view similar to FIG. 4 illustrating the mold in closed position during foaming of the foam precursors.
Figure 12:
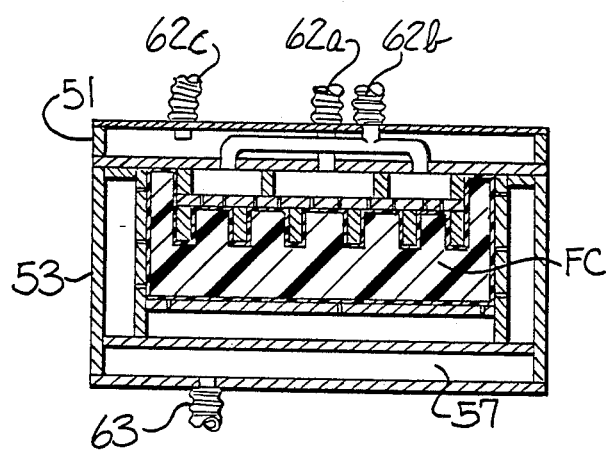
FIG. 12 is a sectional view taken substantially along line 12—12 of FIG. 11.
Figure 13:
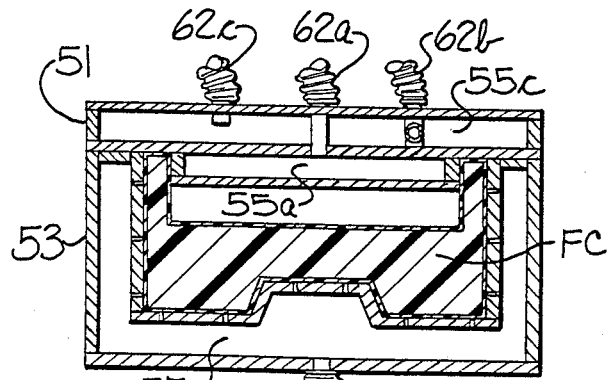
FIG. 13 is a sectional view taken substantially along line 13—13 of FIG. 11.
Figure 14:
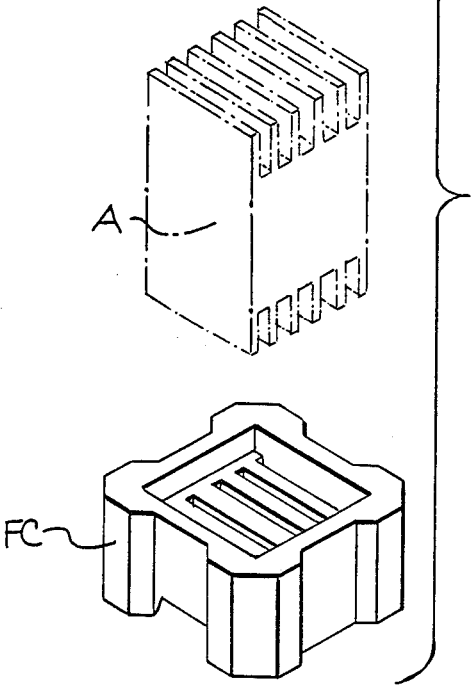
FIG. 14 is an exploded perspective view illustrating the completed foam cushions molded in complementary halves and an article being encased therebetween.

An operator may then manually dispense foam precursors into the bottom mold 53 by a dispensing means 70 (FIG. 10). As with the previous embodiment, the amount of foam precursors injected into the bottom mold 53 may be predetermined and the dispensing means 70 preset. The top mold is then moved into proper relation to the bottom mold by a suitable means (not shown) prior to foaming of the precursors. The foam precursors are then permitted to foam to form one complementary half of a foam cushion (FIG. 11). After the foam precursors have foamed, the top mold 51 is moved away from bottom mold 53 and the finished foam cushion FC is removed from the bottom mold 53. The procedure is repeated to form the other complementary half of a foam cushion FC and an article A may now be protectively packaged between the two complementary halves.

The method of the invention may be used with a variety of complex and intricate mold patterns. Depending on the relative complexity of the mold, the mold may be sectioned into any number of separate areas so that a vacuum may be drawn on those areas in a staged or timed sequence to properly draw the plastic sheet into close conformity with the surface contours of the mold without rippling, wrinkling or folding thereof.

Although the invention herein has been described with reference to two embodiments, it is to be understood that numerous modifications may be made in the illustrative embodiments and other arrangements may be devised without departing from the spirit and scope of the present invention as defined by the appended claims.

I claim:

1. A method of molding foam cushioning using a plastic sheet as a release agent comprising the steps of
   (a) providing a mold having a relatively complex mold image thereon corresponding to the shape and size of the article to be cushioned and with the image being divided into separate and distinct sections from the center of the image outwardly to the periphery thereof,
   (b) placing a plastic sheet loosely over the mold in covering relation to the image thereon,
   (c) drawing a vacuum on the surfaces of the separate and distinct sections of the mold image in a staged sequence to cause the plastic sheet to closely and smoothly conform to the surface of the mold image on the mold, and including drawing a vacuum first on the center section of the mold image and then on the remaining sections progressively outwardly to the outermost sections,
   (d) dispensing foam precursors onto said plastic sheet covered mold and permitting the precursors to foam; and
   (e) removing said foam cushioning and adhered plastic sheet from the mold.

2. A method according to claim 1 wherein said step of drawing a vacuum on the surfaces of the mold image in a staged sequence includes separately timing the vacuum drawn on each separate and distinct section of the mold image.

3. A method according to claim 1 including the steps of placing an open-ended shipping carton over the mold and securing the carton in proper position relative to the mold image thereon prior to the step of dispensing the foam precursors onto the mold, and closing the upper end of the carton after dispensing the foam precursors onto the mold and prior to completion of the foaming of the precursors.

4. A method according to claim 1 wherein the step of providing a mold includes providing cooperable top and bottom molds having respective male and female mold images for forming foam cushions in complementary halves.

5. Apparatus for molding foam cushioning using a plastic sheet as a release agent comprising
 (a) a mold having a relatively complex mold image thereon, said mold image being divided into a plurality of separate and distinct sections from the center of the image outwardly to the periphery thereof,
 (b) means communicating with each of said mold image sections for drawing a vacuum on the surfaces of the mold image in a staged sequence from a center section progressively outwardly to an outermost section to cause a plastic sheet to closely and smoothly conform to the surfaces of the mold image, and
 (c) means for dispensing foam precursors onto said molding for forming of the molded foam cushioning.

6. The apparatus as set forth in claim 1 including means for separately timing the drawing of vacuum onto each separate and distinct section of the mold image.

7. The apparatus as set forth in claim 1 wherein said means for drawing a vacuum on the surfaces of the separate and distinct sections of the mold image includes a vacuum source separately connected to each separate and distinct section of said mold image.

8. The apparatus as set forth in claim 1 wherein said mold includes means for receiving and positioning a carton in which said foam cushioning is to be molded.

9. The apparatus as set forth in claim 5 wherein said mold includes a top mold having a male mold image and bottom mold having a female mold image for forming foam cushions in complementary halves which are adapted to receive an article to be packaged therebetween.

* * * * *

UNITED STATES PATENT AND TRADEMARK OFFICE
CERTIFICATE OF CORRECTION

PATENT NO. : 4,761,257

DATED : August 2, 1988

INVENTOR(S) : Eric R. Bunn

It is certified that error appears in the above-identified patent and that said Letters Patent is hereby corrected as shown below:

Column 8, line 7, please change "1" to -- 5 --.

Column 8, line 11, please change "1" to -- 5 --.

Column 8, line 16, please change "1" to -- 5 --.

Signed and Sealed this

Tenth Day of January, 1989

*Attest:*

DONALD J. QUIGG

*Attesting Officer*    *Commissioner of Patents and Trademarks*